(12) United States Patent
Lander

(10) Patent No.: US 7,350,229 B1
(45) Date of Patent: Mar. 25, 2008

(54) AUTHENTICATION AND AUTHORIZATION MAPPING FOR A COMPUTER NETWORK

(75) Inventor: Vadim Lander, Newton, MA (US)

(73) Assignee: Netegrity, Inc., Waltham, MA (US)

( * ) Notice: Subject to any disclaimer, the term of this patent is extended or adjusted under 35 U.S.C. 154(b) by 723 days.

(21) Appl. No.: 09/972,226

(22) Filed: Oct. 4, 2001

Related U.S. Application Data

(60) Provisional application No. 60/280,368, filed on Mar. 29, 2001, provisional application No. 60/273,914, filed on Mar. 7, 2001.

(51) Int. Cl.
- G06F 7/04 (2006.01)
- G06F 7/08 (2006.01)
- H04L 9/32 (2006.01)

(52) U.S. Cl. ............... 726/8; 726/6; 726/10; 713/155; 713/170; 713/182; 713/183; 713/169; 709/229; 709/225

(58) Field of Classification Search ............... 713/201, 713/182, 155, 170, 183, 167; 726/8, 6, 10
See application file for complete search history.

(56) References Cited

U.S. PATENT DOCUMENTS

| | | | | |
|---|---|---|---|---|
| 6,158,010 | A | 12/2000 | Moriconi et al. | ........... 713/201 |
| 6,178,511 | B1 * | 1/2001 | Cohen et al. | ............... 713/201 |
| 6,205,480 | B1 * | 3/2001 | Broadhurst et al. | ......... 709/225 |
| 6,275,941 | B1 * | 8/2001 | Saito et al. | ..................... 726/2 |
| 6,275,944 | B1 * | 8/2001 | Kao et al. | .................... 713/202 |
| 6,341,312 | B1 * | 1/2002 | French et al. | ............... 709/227 |
| 6,609,198 | B1 * | 8/2003 | Wood et al. | ................ 713/155 |
| 6,629,246 | B1 * | 9/2003 | Gadi | .......................... 713/202 |
| 6,826,696 | B1 * | 11/2004 | Chawla et al. | .............. 713/201 |
| 6,836,799 | B1 * | 12/2004 | Philyaw et al. | ............. 709/224 |
| 6,898,577 | B1 * | 5/2005 | Johnson | ........................ 705/51 |
| 7,016,875 | B1 * | 3/2006 | Steele et al. | .................. 705/44 |
| 7,089,585 | B1 * | 8/2006 | Dharmarajan | .................. 726/8 |
| 2002/0010776 | A1 * | 1/2002 | Lerner | ........................ 709/225 |
| 2002/0022483 | A1 * | 2/2002 | Thompson et al. | ......... 455/439 |
| 2002/0161901 | A1 * | 10/2002 | Weissman | .................... 709/229 |
| 2005/0044423 | A1 * | 2/2005 | Mellmer et al. | ............ 713/201 |

OTHER PUBLICATIONS

Netegrity™ "How to Securely Manage and Control User Access to E-Commerce Web Sites" Netegrity White Paper, Netegrity, Inc., Waltham, Massachusetts; Oct. 5, 1999.

* cited by examiner

*Primary Examiner*—Nasser Moazzami
*Assistant Examiner*—Eleni A Shiferaw
(74) *Attorney, Agent, or Firm*—Baker Botts L.L.P.

(57) ABSTRACT

A method and apparatus for a network-wide authentication and authorization mapping system for a network is provided. The global authentication and authorization mapping system enables a seamless transition from one web-based application in the network configuration to another web-based application in the network configuration, including a single sign-on capability for users. There are no localized security enforcement processes required to further authenticate a user.

34 Claims, 6 Drawing Sheets

AUTHENTICATION AND AUTHORIZATION MAPPING FOR A COMPUTER NETWORK

RELATED APPLICATION

This application claims priority to co-pending U.S. Provisional Application Ser. No. 60/273,914, filed Mar. 7, 2001, and U.S. Provisional Application Ser. No. 60/280,368, filed Mar. 29, 2001, for all subject matter common to these applications and the present application. The disclosures of said same Provisional Applications are hereby incorporated herein by reference in their entirety.

FIELD OF THE INVENTION

The invention relates to web-based security, and more particularly relates to a network-wide authentication and authorization mapping system for a web-based network.

BACKGROUND OF THE INVENTION

E-commerce is driving companies to develop an entire new set of applications that are available to businesses and individuals on the World Wide Web. Web-based applications enable corporations to offer a wide range of products and services by supporting corporate business processes. Such processes include online retail, customer service, supply chain procurement, and delivery of operational and transactional data.

Some people that visit an enterprise's web site (i.e., a location on the World Wide Web) may simply be browsing, while others may wish to use services requiring the exchange of confidential information or other protected data. Additionally, an enterprise may want a software application to be available to only a specific class of people (e.g., paid subscribers). Therefore, once a person enters the web site, the enterprise must control which corporate computers and applications, as well as what information, that person can use. The enterprise needs a means of securing access to the enterprise network to ensure that particular data on the web site is not available to a person who was not authenticated and authorized.

People access an enterprise's web site from the Internet or the enterprise's intranet through a front-end server in the enterprise's computer network. Generally, an enterprise has one or more centralized computers that function as front-end servers in the enterprise network. The front-end servers must control and secure access to the enterprise network to protect valuable data from unauthorized users. One method of controlling and securing access is via authentication and authorization processes. These processes limit access to the enterprise network, access to the particular computer systems and other resources in the enterprise network, and actions available to a user once access is permitted (e.g., view specific accounts or purchase securities on margin).

The purpose of an authentication process is to determine whether the true identity of a user is that which the user presents when attempting access to the enterprise network, for example via a username, password, and credentials. The authentication process validates the user's credentials before permitting access to the enterprise network or a secure resource within the enterprise network. A user's credentials may include a digital certificate obtained from a certificate-issuing authority (e.g., VeriSign, Inc. headquartered in Mountain View, Calif.), a username and a password, or additional information known only to the user and the authentication process (e.g., a personal identification number, known as a PIN).

The purpose of an authorization process is to determine the actions available to a user once authenticated. The authorization process checks a user's permissions to ensure that he or she is entitled to have access to a protected computer or protected resource in the enterprise network. Furthermore, the authorization process determines what the user is entitled to do once access to the protected computer or protected resource is granted.

Other enterprise computers, which are networked to the front-end servers, run a variety of applications. A computer networked to the front-end servers, hereinafter referred to as a back-end server, may have access to a database that contains information used to customize an application running on the back-end server for users of the application. The database system may be interfaced directly to application software executing on a back-end server, and may not communicate with other applications installed in the enterprise network.

A front-end server may run the authentication process, thereby verifying the user's identification and validating the user's credentials. Once the user is authenticated and gains access to the enterprise network (or protected resources in the enterprise network), the user's web browser may display a menu from which a service may be chosen. In the financial industry, services may include accessing private portfolios to check account balances and transactions, trading securities, or conducting research on publicly held companies. In a business-to-business e-commerce environment, services may include placing an order for a product or checking the status of an order.

After the user makes a selection, the appropriate application on a back-end server is contacted. The user may then be prompted to sign onto the application. Before being able to use the chosen application, a second authentication process is executed to check the authenticity of the user. This second authentication process on the back-end server is redundant because the user was previously authenticated by one of the front-end servers. However, the back-end server has no means of knowing that the user was previously authenticated. Additionally, an application-specific authorization process is executed to check and obtain entitlements that further specify a user's rights to access the application and utilize certain features offered by the application.

Each application may contain unique authentication and authorization processes. These processes are security mechanisms that control user access to the resources (e.g., services and data) provided by an application. The authentication and authorization processes may be coded directly into the application and the application may store information that imposes a set of access privileges on a particular user. The information is stored in a database that is local to the application, and is generally completely independent from the user directory on the front-end servers and from the user directories for all other applications. Therefore, redundant information regarding the user may be stored.

The unique security processes that perform authentication and authorization functions may be managed by different groups of individuals, hereinafter referred to as system administrators. Thus, privileges associated with a particular user may not be synchronized throughout the computer network, thereby compromising security. For example, a security compromise due to a synchronization problem may occur when a system administrator for one back-end server removes access privileges, yet the front-end servers continue to permit the user to contact the back-end server. Some enterprises may synchronize the databases throughout the network on a daily basis to avoid such a security compromise. However, if the synchronization process does not successfully synchronize the databases (e.g., a database was inaccessible), a security compromise may still occur.

Each front-end server and each back-end server may store user identifiers and corresponding access privilege codes in their respective databases, rather than using a single central database to store such information. Localized user identifiers and privilege codes are necessary because the front-end servers have no means of propagating the identifiers and privilege codes throughout the enterprise network to the back-end servers. Furthermore, management of the various computers and applications in an enterprise network is generally delegated to different system administrators who require unique user information for the systems they manage. As a result, the user must keep track of and use multiple user identifiers, one for use on the front-end servers and one for use on each back-end server. Even when the multiple user identifiers contain identical alpha-numeric sequences, the user must submit to a login process for the front-end servers and each back-end server, thereby experiencing delayed access while moving between applications in the enterprise network.

As a result of storing multiple identifiers throughout the enterprise network for the same user, no means exists for drawing any correlation between a user accessing one application and the same user accessing a different application in the enterprise network. Such a correlation is useful for sharing authentication and authorization data, not only within the enterprise network, but also for affiliated services available from a business partner's web site.

Generally, an enterprise has the goal of repeatedly bringing many businesses and individuals to the enterprise's web site. To achieve this goal, the web site must be easy to navigate, and without delay, allow users to efficiently access the applications that provide the services. Requiring the user to sign onto the web site multiple times introduces delay in accessing the enterprise's applications.

Some enterprise networks alleviate the multiple sign-on issue by executing the login process on a back-end server without the user's knowledge. An authentication and authorization process is executed nevertheless, which takes time and causes a delay in accessing the application. Instant access is expected for e-commerce applications and other types of applications, and therefore, the user may become impatient and frustrated due to the delay. Such a user may then choose to conduct business elsewhere or use resources available at another enterprise's web site.

As web-based applications proliferate, a scalability issue arises that poses a challenge to corporations and other enterprises. As previously discussed, each back-end server may be managed by different system administrators. Each system administrator may have a unique set of criteria and guidelines for managing the back-end server for which he or she is responsible, including security management procedures. A large financial services corporation may have more than 100 computers in their enterprise network. Therefore, numerous system administrators may be managing security enforcement mechanisms for the web site and the efforts of those system administrators may not be coordinated. Additionally, storing user access privileges in a central database may not be feasible, for example, due to the delegation of system administration tasks and the unique security requirements of each application. Traditional security and user management tools do not have a comprehensive security infrastructure currently in place.

Known Single Sign-On solutions (e.g., Siteminder® v3.6 access management application produced by Netegrity, Inc. of Waltham, Mass.) exist that pass a user's identity between heterogeneous web servers. When a user authenticates him or herself, a cookie is created containing the necessary session information identifying a user by a name that may be used as a unique key to lookup the user's record in the authentication database. This user name varies depending upon the type of the authentication database deployed at a site. For example, the login name may be used with SQL databases. The entire Distinguished Name is stored in the cookie for LDAP directories.

The session information stored in the cookie enables an access management application to uniquely identify a user without forcing the user to re-authenticate when the authorization database is the same database as the authentication database. Cross-domain SSO can also be supported, enabling credentials to be available to all other domains so long as those domains utilize the authentication database having identical user names.

There is no existing solution for uniquely identifying users throughout a wide range of applications. For example, many customer environments have applications that have individual authentication and authorization databases. Over the years, each of these applications have tended to define their own unique and distinct user name for the same user. Although SSO solutions help by authenticating the user out of the central authentication database, the applications are not aware of the exact user name as it pertained to the applications' specific authorization database.

Another unsolved issue relates to the requirement of the SSO to maintain a centralized mapping of all the application-specific user names for the same user. This is needed to ensure data consistency across multiple applications. For example, a user's action such as updating a user profile may require that user-specific data be updated in multiple applications simultaneously. Having to maintain this kind of synchronization is very difficult, costly, and does not scale as the number of users increases.

Still another unsolved issue relates to the inability for multiple businesses to partner up and provide business services to the same user. A user can not carry out a business transaction on one web site, and then go to another web site without being re-challenged for credentials. Again, this is because the applications that are running on these sites do not share the same user name structure.

The information that known SSO solutions store in the cookie is used solely for authentication. Therefore, the applications that the user attempted to access are not cognizant of the user's identity for the purpose of authorizing the user. To ascertain the user identity, applications throughout the enterprise network must therefore perform their own mapping of the central authentication identity to the application-specific authorization identity.

SUMMARY OF THE INVENTION

There is a need for a global authentication and authorization process to provide a mechanism that greatly simplifies the multitude of access processes throughout an enterprise network, while securing access to protected computer systems and other resources. The present invention is directed toward further solutions to address this existing need.

In accordance with one example embodiment of the present invention, an electronic device in communication with a network executes a method for authenticating and authorizing a user. The method includes receiving a user request from a user electronic device. An identity of the user is determined, wherein the step of determining further includes searching for information relating to the user in a repository of user information. The searching step is based at least partially on the user request and a login identity supplied by the user. A user identifier representing the user is retrieved upon locating the information relating to the user. At least the user identifier is stored in a data packet. The data packet is sent to a storage device in a manner such that the data packet is transmittable to electronic devices in communication with the network when the user attempts to access a resource within the network. An authorization datum associated with the user, based at least partially on the user identifier, is retrieved from the resource. The receiving step can include the user providing a login name to the network.

According to further aspects of the present invention, prior to the searching step, the method further includes registering the user with the network. The user identifier relating to the user is generated. The user identifier is inserted in the repository of user information. A plurality of repositories containing authorization data are populated with the user identifier.

The method can further include the step of the user providing a security identity, or a digital certificate.

According to still further aspects of the present invention, the determining step can include indicating a result to the user regarding permitted access to the network, and/or requesting a user credential of the user. In addition, the sending step can further include sending the data packet to a user electronic device supporting the storage device, and/or transmitting a cookie to the user electronic device enabling an identity of the user to be automatically recognized when the cookie is transmitted to the resource.

An additional aspect of the present invention can include the step of storing information in addition to the user identifier in the data packet, and encrypting the data packet.

According to other aspects of the present invention, in an electronic device in communication with a network, a method for a user to access a plurality of resources having different authorization requirements includes the network storing a plurality of user identifiers with the plurality of resources. The user accesses the network via a user electronic device. The user provides identifying data to the network. The network retrieves a unique user identifier for the user in a repository of unique user identifiers. The network further stores the unique user identifier on a storage device and the unique user identifier indicates that the user is authenticated. The user then accesses one of the plurality of resources, wherein the unique user identifier is transmitted to one of the plurality of resources to identify the user such that the user can access authorized resources without providing additional identifying information and the user is denied access to unauthorized resources.

The unique user identifier can provide a key to retrieve an authorization datum associated with one of the plurality of user identifiers matching the unique user identifier from one of the plurality of resources.

In accordance with a further aspect of the present invention, prior to the step of storing the plurality of user identifiers, the method includes the user registering with the network. The network generates the unique user identifier for the user, and the network inserts the unique user identifier in at least one of the plurality of user identifiers.

Further aspects of the present invention provide the user supplying at least one of a login name, a password, and a digital certificate, and may also supply credentials.

According to yet another aspect of the present invention, a method implemented by at least one electronic device for authentication and authorization using a user identifier to retrieve user data includes the step of accessing a repository containing a plurality of user identifiers. The user identifier is retrieved from the repository and is unique to a user. The user identifier is stored in a data packet readable by an electronic device, and then transmitted to a storage device coupled to the electronic device. The data packet is made available to a resource configured within an enterprise network to authorize the user.

In accordance with another aspect of the present invention, the step of storing includes packaging the user identifier in a cookie suitable for storage on at least one of a user electronic device and a user proxy electronic device. The method can also further include delivering the data packet to the resource configured within the enterprise network, extracting the user identifier from the data packet, accessing a repository containing a plurality of user entitlement data, and retrieving a user-specific entitlement from the repository containing the plurality of user entitlement data using the user identifier to locate the user-specific entitlement.

In accordance with one embodiment of the present invention, a network of electronic devices suitable for implementing a method for authentication and authorization using a user identifier to retrieve user data has a repository containing a plurality of user identifiers, each user identifier being unique to a user and the repository being in communication with the network. A first software tool is provided suitable for receiving user login information, accessing the repository, locating a user identifier relating to the user, and transmitting any such user identifier to an electronic storage device suitable for storing the user identifier in a data packet for transmission to resources within the network. A user electronic device suitable for communication with the network is also provided. A second software tool suitable for receiving the data packet and locating authorization datum of the user is additionally provided.

According to further aspects of the present invention, the electronic storage device is readable by a software program suitable for accessing the network. The software program can be a web browser. The electronic storage device can be a resource configured within the network. The network can further include a repository containing authorization data, the repository being accessible using the user identifier as a key to retrieve a user-specific entitlement associated with the user.

According to still another embodiment of the present invention, a computer readable medium contains a software program for executing a method for authenticating and authorizing a user. The method includes receiving a user request from a user electronic device, determining an identity of the user wherein the step of determining further includes the steps of searching for information of the user in an authentication database, locating the user credential in reference to the user in the authentication database, retrieving a universal identifier representing the user upon locating the user credential in reference to the user, packaging at least the universal identifier in a data packet, and transmitting the data packet to a user electronic device such that the data packet is transmittable to electronic devices in communication with a network when the user attempts to access a resource within the network such that the user can access authorized resources without providing additional identifying information.

Further embodiments of the present invention can include the method executed by the software program further transmitting the data packet to the resource within the network, accessing a repository containing a plurality of user identifiers using the universal identifier in a search operation, and retrieving a user-specific entitlement from the repository containing a plurality of user identifiers, the user-specific entitlement being associated with the universal identifier.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
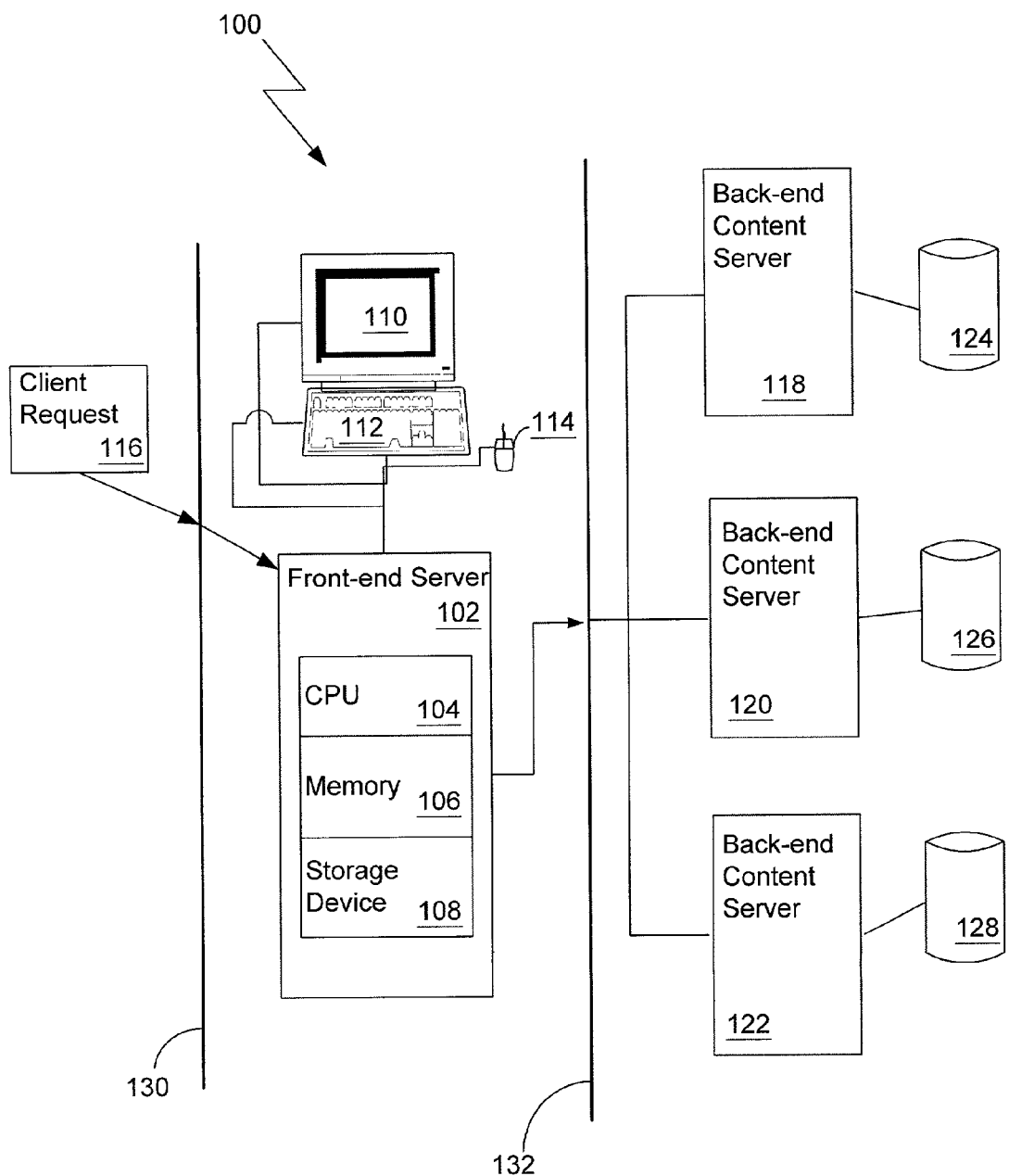
FIG. 1 is an illustration of a computer network according to one aspect of the present invention.

The present invention generally relates to a network-wide authentication and authorization mapping system for a network. The global authentication and authorization mapping system enables a seamless transition from one web-based application in the network configuration to another web-based application in the network configuration, including a single sign-on capability for users. Furthermore, the present invention does not require localized security enforcement processes that authenticate a user. Rather, all back-end servers and applications benefit from a network-wide authentication process executed by the front-end servers in the enterprise network.

Other aspects of the present invention include the sharing of user information. A user identifier, propagated throughout the network, logically binds all applications in the enterprise network. Applications have the capability of obtaining the user identifier using a cookie stored in a web browser, or using another type of data packet accessible by network resources. Back-end servers populated with the user identifier recognize the user's identification and can retrieve locally stored user data for the identified user. User entitlement information can also be stored in the cookie (or other type of data packet), and therefore, be shared among the back-end servers configured in the enterprise network. For these and other reasons, a global authentication and authorization mapping system provides a secure, reliable, scalable, and efficient means to enforce authentication and authorization measures throughout a network.

The spirit and scope of the present invention applies to networks in general. However, for the sake of clarity the description herein utilizes the example of an enterprise network for implementing the system and method of the present invention. An enterprise network is a network belonging to, or affiliated with, an enterprise, corporation, association, or some other group, that utilizes a plurality of computers, often linked together in one or more sub-networks. Any network or group of networks requiring authentication and authorization actions is included in any reference to an enterprise network herein.

FIGS. 1 through 6, wherein like parts are designated by like reference numerals throughout, illustrate example embodiments of an authentication and authorization mapping system and method according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

FIG. 1 illustrates a computer hardware configuration of an enterprise network 100 formed of example embodiments of electronic devices. Electronic devices suitable for practicing the illustrative embodiment of the present invention are representative of a number of different technologies, such as personal computers (PCs), laptop computers, workstations, personal digital assistants (PDAs), Internet appliances, cellular telephones, and the like. Electronic devices include a central processing unit (CPU) and a display device. The display device enables the electronic device to communicate directly with a user through a visual display. The electronic device further includes input devices such as a keyboard, mouse, stylus, trackball, joystick, touch pad, touch screen, and the like. The electronic device typically includes primary storage and secondary storage for storing data and instructions. The storage devices can include such technologies as a floppy drive, hard drive, tape drive, optical drive, read only memory (ROM), random access memory (RAM), and the like. Applications such as browsers, JAVA virtual machines (JAVA is a trademark and/or registered trademark of Sun Microsystems, Inc. of Mountain View, Calif., in the United States and in other countries), and other utilities and applications can be resident on one or both of the storage devices. The electronic device often also includes a network interface for communicating with one or more electronic devices external to the electronic device. A modem is one form of establishing a connection with an external electronic device or network. The CPU has either internally, or externally, attached thereto one or more of the aforementioned components.

An electronic device, such as a front-end server 102 receives a client request 116. The front-end server 102 generally contains a CPU 104 containing one or more processors, memory 106, and at least one storage device 108, among other computer components such as a monitor 110, a keyboard input device 112, and a mouse input device 114. The front-end server 102 runs an operating system, such as the WINDOWS 98, WINDOWS 2000, WINDOWS NT, WINDOWS XP, offered by the Microsoft Corporation, UNIX operating system offered by Unix System Laboratories, Inc., and the like. Furthermore, the front-end server 102 can have a variety of software programs installed on the storage device 108. One such software program can implement parts of the invention described herein. The keyboard 112 and mouse 114 can interact with, or configure, a software program, which can display a user interface for such interaction and configuration on the monitor 110. One of ordinary skill in the art will appreciate that there are a number of different hardware and software configurations possible for the front-end server 102.

Other electronic devices in the form of back-end content servers 118, 120, and 122 interface with the front-end server 102. The back-end content servers 118, 120, and 122 can contain conventional hardware, including a CPU, memory, and storage device, and can further include other computer components, such as a monitor, a keyboard input device, a mouse input device, and the like. The back-end content servers 118, 120, and 122 can support software programs that implement parts of the invention described herein, and can run applications that provide products and services to users that access the back-end content servers 118, 120, and 122. Additionally, database systems 124, 126, and 128 interface with the back-end content servers 118, 120, and 122 to provide data to the software programs to implement parts of the present invention, and to the various applications. Application servers (not shown) contain additional application software programs and can also interface with the back-end content servers 118, 120, and 122 to provide additional resources to the back-end content servers 118, 120, and 122.

The enterprise network 100 can include other electronic devices, hardware, and software components as well. Firewalls 130 and 132, for example, hinder unauthorized access to the enterprise network. There can be hardware, software, or a combination of hardware and software firewalls, illustrated as a first firewall 130 and a second firewall 132. The first firewall 130 can intercept the user request 116 before the user request 116 reaches the front-end server 102. The second firewall 132 can be disposed between the front-end server 102 and back-end content servers 118, 120, and 122 as a further security measure.

One of ordinary skill in the art will understand that FIG. 1 illustrates only one example front-end server 102 for the sake of clarity, but that typical enterprise networks have a cluster of front-end servers to handle user requests for access to the web site. The number of front-send servers is based at least partially on the number of users accessing the enterprise network. In addition to centralized access control, a front-end server cluster provides load balancing capabilities. A network switch or switches (not shown) implement load balancing functions by determining which front-end server in the cluster will receive the user request. The front-end server cluster also acts as a fault tolerant mechanism because access to the enterprise network is not affected if one front-end server in the cluster becomes inoperable.

Figure 2:
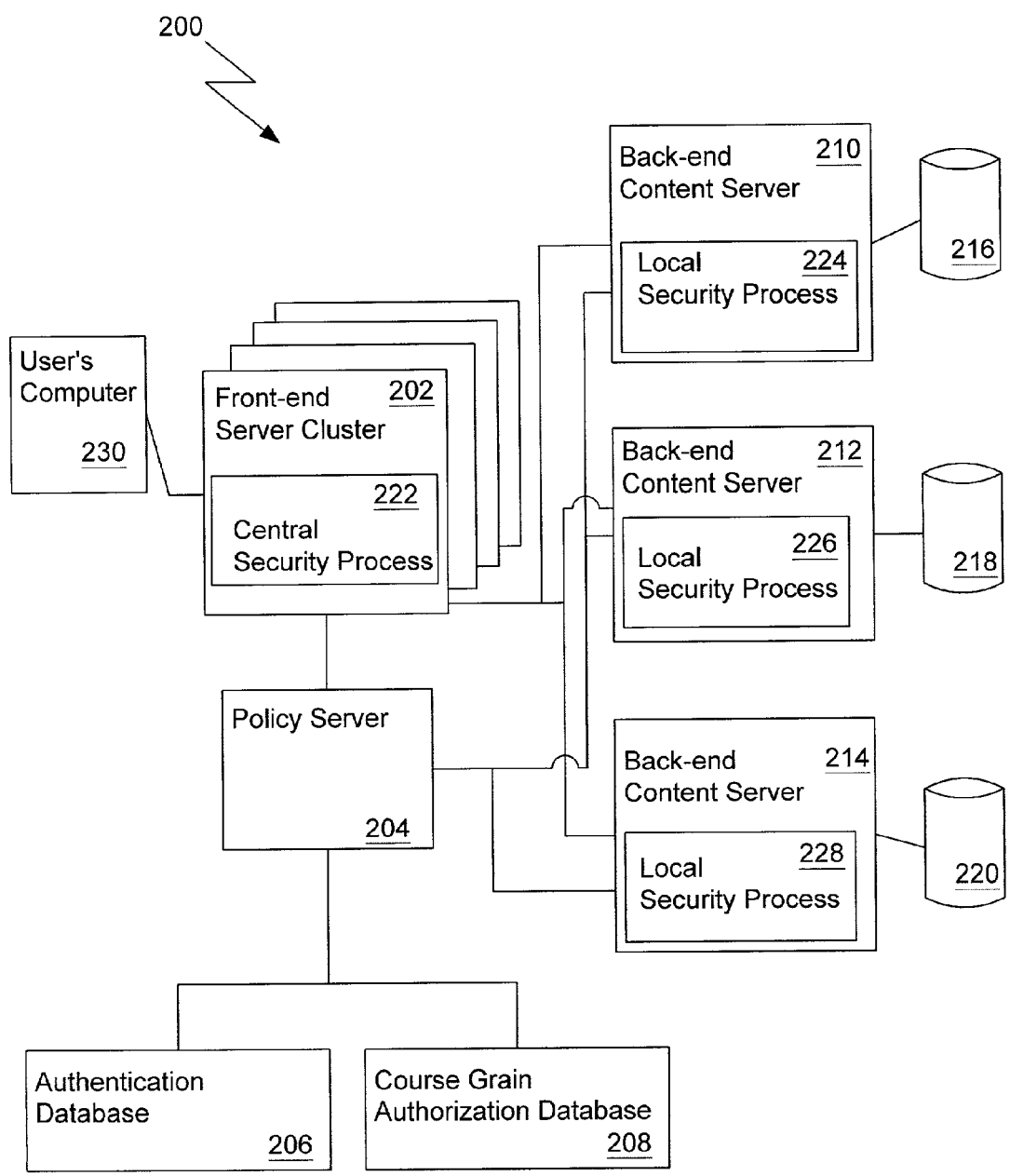
FIG. 2 is an illustration of a computer network with security processes according to one aspect of the present invention.

Referring to FIG. 2, an enterprise network 200 contains hardware and software components for implementing the present invention. The front-end server cluster 202 interfaces with a policy server 204, which provides services that include policy management, authentication, authorization, accounting services, and the like.

One embodiment of the present invention enables system administrators to configure the policy server 204. For example, system administrators can define security policies associated with a particular group of users (e.g., high-volume customers) and can associate the security policy with one or more access control rules that define operations allowed for each protected resource. The security policies and access control rules are the means for specifying authorization to particular resources. Such a policy server 204 is implemented in the SiteMinder product available from Netegrity, Inc. of Waltham, Mass.

In accordance with one example embodiment, a security policy specifies a group of users and the rules that apply to the group of users in the form:

Policy=User/Group(s)+Rule(s)

A rule specified by the security policy lists a resource and the actions the group of users can perform using the resource in the form:

Rule=Resource+Action+Resource Location where the resource is a web page or directory. The action can be an operation such as "GET", "POST", or "PUT" operation, and the resource location can be a target web agent name, such as "/apps/priv".

The authentication process executes one time per user and takes place using an authentication database 206, which is configured as a repository of user information. The policy server 204 also has access to a coarse-grain authorization database 208. The authentication database 206 and the coarse-grain authorization database 208 can support any structured query language (SQL), and can be relational databases, directories that are compliant with the Lightweight Directory Access Protocol (LDAP), lists that contain the user information, and the like.

In one embodiment, the authentication database 206 and coarse-grain authorization database 208 store user information in a directory that is compliant with the LDAP open protocol. The LDAP open protocol is useful for accessing and managing directory services. LDAP-compliant directories store data in files that are organized into a hierarchical structure. Web-based applications running on a back-end server in the enterprise network 200, which are configured as part of the web site, can fetch data from the LDAP-compliant directories. In addition to LDAP directories, the authentication database 206 and coarse-grain authorization database 208 can store user information in directories that are compliant with the Open DataBase Connectivity (ODBC) application programming interface. ODBC is a standard database access method developed by Microsoft Corporation of Redmond, Wash.

The back-end content servers 210, 212, and 214 can each execute fine-grain authorization processes. The fine-grain authorization processes use local authorization databases 216, 218, and 220 configured as repositories of user information, which can also be SQL databases. User entitlements, which include authorization data and user preferences for particular applications can be stored in the local authorization databases 216, 218, and 220. Furthermore, a tier of application servers (not shown) can interface with the back-end content servers 210, 212, and 214, thereby providing additional resources to the back-end content servers 210, 212, and 214 (e.g., software applications and computational hardware).

The front-end server cluster 202 executes the central security process 222 when the user wants to access protected resources. The central security process 222 integrates through the web server extension API (that allows server functionality to be extended) in each front-end server in the front-end server cluster 202. The central security process 222 functions as a gatekeeper that determines whether the user can continue accessing the enterprise network. The central security process 222 communicates with the policy server 204 to enforce policies for user access to resources.

Local security processes 224, 226, and 228 execute on the back-end servers 210, 212, and 214 when protected applications are first contacted. Each local security process 224, 226, and 228 receives a HyperText Transfer Protocol (HTTP) header variable and secures the back-end server resources by carrying out fine-grain authorization procedures.

The central security process 222 and the local security processes 224, 226, and 228 can be in the form of JAVA servlets or agent plug-ins (i.e., software modules that add specific features to software applications), and can communicate to other components in the configuration via HTTP, which defines a message format and message transmission scheme.

The messages transmitted amongst the components identify a user and contain additional information about the user, such as user entitlements. If a user has registered with the enterprise network, a unique identifier (hereinafter referred to as the universal identifier) is stored with a user record in the authentication database 206, the coarse-grain authorization database 208, and the local authorization databases 216, 218, and 220. When the user signs onto the front-end server cluster 202, the central security process 222 transmits the user login data (e.g., username and password) to the policy server 204. The policy server 204 can obtain information pertaining to the user by executing a database search procedure to locate a record for the user in the authentication database 206 using the user login data as a key to locate the user record. The user can be verified and the user's credentials can be validated, as later discussed herein, using the record retrieved from the authentication database 206. The user's universal identifier is also retrieved from the authentication database 206. After authentication of the user, and authorization by the coarse-grain authorization process, the central security process 222 packages the universal identifier, and possibly other data, in a cookie and transmits the cookie to the web browser installed on the user's computer 230 for storage. The cookie containing the universal identifier passes to web-based applications to uniquely identify a user throughout a range of application environments.

When the previously authenticated user makes subsequent attempts to access a protected resource, the cookie containing the universal identifier is transmitted to the front-end server cluster 202. The central security process 222 extracts the universal identifier, and possibly other data, from the cookie and transmits the universal identifier to the back-end server that controls access to the protected resource. The presence of the universal identifier in the transmission indicates that the user was authenticated and the coarse-grain authorization process has taken place.

The particular enterprise determines the content of the universal identifier, and generally, is not the same content as the username and password content provided by the user during the login process. Rather, the universal identifier is a unique value. For example, the universal identifier can be a user's account number, social security number, or some other numeric or alpha-numeric combination. The user identifier may also be encrypted as an additional security precaution.

The universal identifier is created when the user establishes an account with the enterprise. One method of establishing an account is via an on-line registration process. During the registration process, the enterprise collects information about the user and stores the information as a user profile. The user profile can include any information that the enterprise requires from the user or wants to store for the user, including the applications that a user wants to access. At the time the enterprise collects the information, a manual or automated account provisioning process generates a universal identifier for the user.

The universal identifier is stored as an attribute in a user record in the authentication database with other profile data. A user record containing the universal identifier can also be stored in the coarse-grain authorization database. Additionally, the registered user's universal identifier can be included in all authorization databases interfaced to the back-end servers for which the user is registered and that require local authorization. The universal identifier is a key field to enable the user information stored in the local databases to be retrieved. Thus, all applications that a customer can use are standardized on the universal identifier. An account provisioning process formulated by the enterprise determines the method used for populating the databases with the universal identifier and other user data. The account provisioning process formulated by the enterprise can be an automated, a semi-automated, or a manual process.

After a user is authenticated using the authentication database 206, some of the data in the user record (such as the username, password, and user entitlements) is packaged with the universal identifier and is delivered as a cookie to the user's browser, where the cookie is stored. The user identifier can also be used as a key to the coarse-grain authorization database 208 to retrieve user entitlement information.

The universal identifier provides a single identifier for all applications configured in the enterprise network. The applications in the enterprise network can read the universal identifier because it is stored in a cookie on the user's browser. The front-end server transmits the universal identifier as an HTTP header variable to a back-end server that the user attempts to access. Applications on the back-end server use the universal identifier in a lookup operation to retrieve authorization information from a local database for the specific application, such as the local authorization databases 216, 218, and 220.

Figure 3:
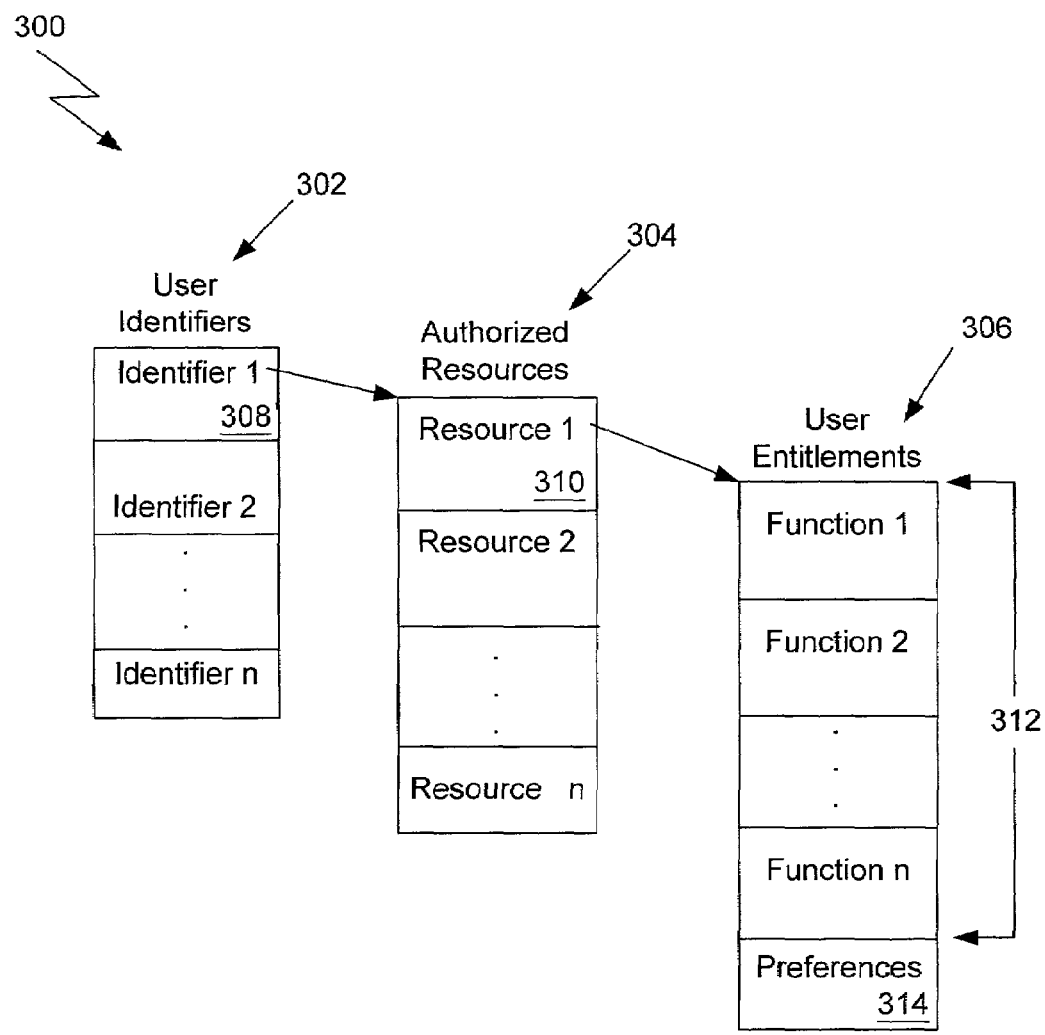
FIG. 3 is a diagrammatic illustration of a relational database search according to one aspect of the present invention.

FIG. 3 illustrates how an authorization process searches for a user's entitlements from a relational database according to one embodiment. A relational database 300 consists of a series of tables. Each table contains a series of records. A table of user identifiers 302 contains records for all users that have registered with the enterprise network. A table of authorized resources 304 contains all resources (e.g., applications) that a user is allowed to access. A user entitlements table 306 contains records that specify what a user can do with an authorized resource once the resource is accessed.

The universal identifier and resource name that the user is attempting to access is passed to the authorization process. A Uniform Resource Locator (URL), which contains a domain name and a file name such as an HTML page, specifies the resource name. A sequence of database lookup operations uses the universal identifier and resource name to search the tables in a prescribed order and retrieve records that contain data for the user.

First, a database lookup operation can locate a user identifier 308 in the table of user identifiers 302. A pointer to a table of authorized resources 304 that the user can access is stored in the record with the user identifier 308 (e.g., as an attribute in the record). A database lookup operation locates an authorized resource 310 (contained as a record in the table of authorized resources 304), which can have a pointer stored as an attribute in the record to the user entitlements table 306. The user entitlements table 306 contains entries that specify what functions 312 the user can perform with the authorized resource and specify the user's preferences 314 for the authorized resource 310. The functions 312 and user's preference 314 are retrieved from the user entitlements table 306 and passed to the resource.

Figure 4:
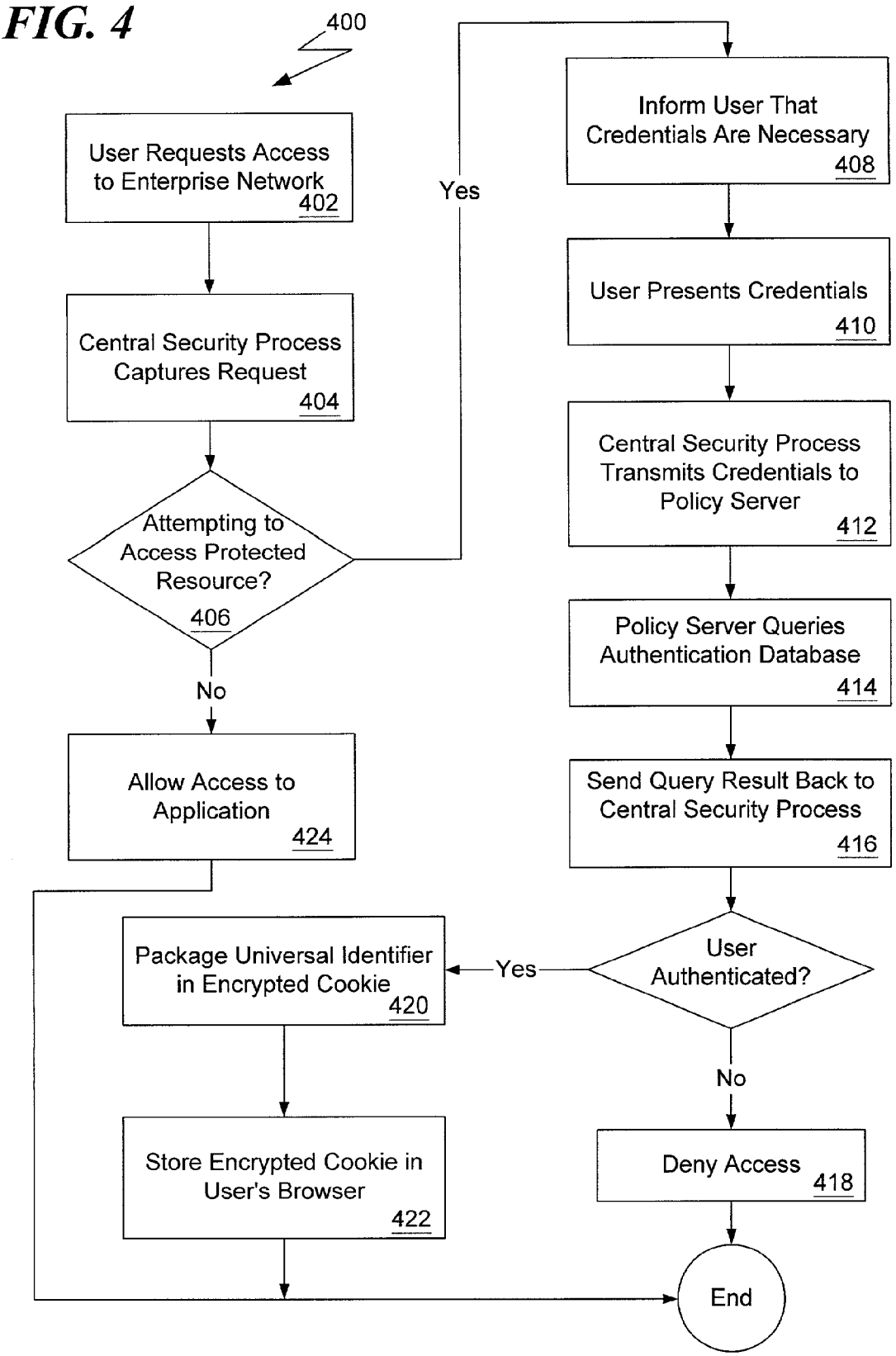
FIG. 4 is a flow chart of a global authentication process according to one aspect of the present invention.

FIG. 4 is a flow chart of the steps in a global authentication process 400, which validates and verifies the user. To begin, a user requests access to the enterprise network (step 402). The central security process captures the request (step 404) and determines whether the user is attempting to access a protected resource (step 406). If authentication is not required, the user is allowed access to the resource (step 424). If authentication is required, the central security process then informs the user that credentials are necessary before access will be permitted (step 408). The user then presents a security identity as credentials to the central security process, for example by means of a digital certificate (step 410). The central security process transmits the user's credentials to the policy server for authentication (step 412). The policy server then queries the authentication database (step 414), for example, by using the user login name and credentials as a key in the database search operation. The policy server sends the query result back to the central security process (step 416). If the result indicates that the user was not authenticated, the central security process can deny access to the enterprise network (step 418). If the result indicates that the user was authenticated, the central security process packages the universal identifier retrieved from the authentication database, along with other information (e.g., entitlements and personalization data used by the applications), as an encrypted cookie (step 420). The encrypted cookie is transmitted back to the user's browser where the cookie is stored for the remainder of the session (step 422), enabling the user's identity to be automatically recognized when the cookie is transmitted to an application. This automatic recognition capability provides for single sign-on to occur because other applications in the enterprise network can recognize the identity of the user without executing a sign-on process.

Figure 5:
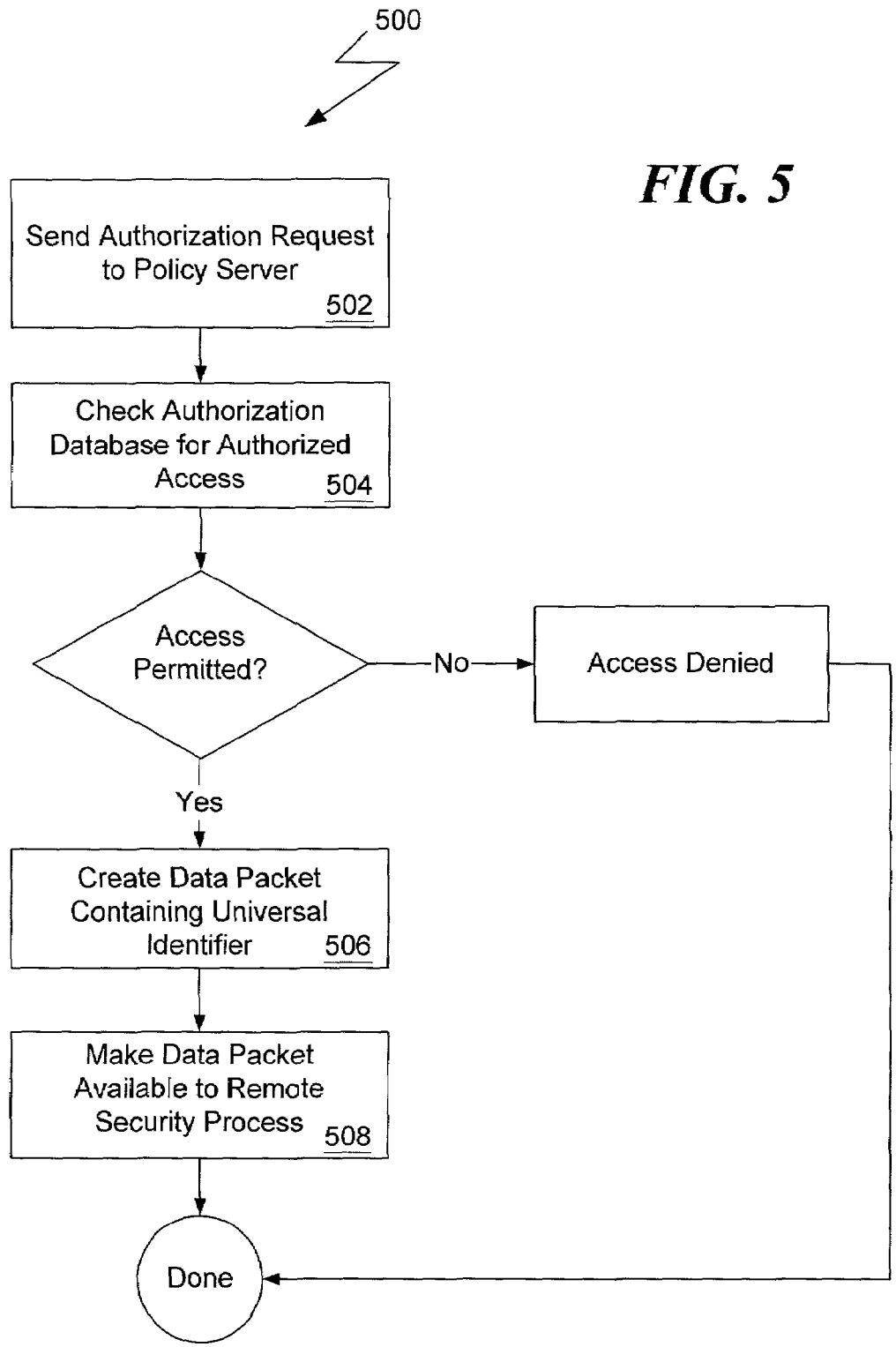
FIG. 5 is a flow chart of a coarse-grain authorization process according to one aspect of the present invention.

FIG. 5 is a flow chart of a procedure for a coarse-grain authorization process 500. The coarse-grain authorization process 500 takes place after authentication of the user. The central security process sends an authorization request to the policy server (step 502). The policy server queries the coarse-grain authorization database interfaced to the policy server to determine whether the user should be authorized to access the protected application (step 504). The query can be implemented as a series of relational database lookup operations to retrieve data, as previously discussed. The coarse-grain authorization database retrieves user entitlements using the universal identifier, and possibly a URL, as keys in the lookup operations.

If the policy server indicates to the central security process that the user is entitled to access the protected application, the central security process creates a data packet, which can be formatted as HTTP header variables, containing the universal identifier (step 506). The data packet is made available to a local security process executing on a back-end server (step 508). The data packet can also contain user entitlements used to personalize the content for the user, such as discount or margin amounts.

Figure 6:
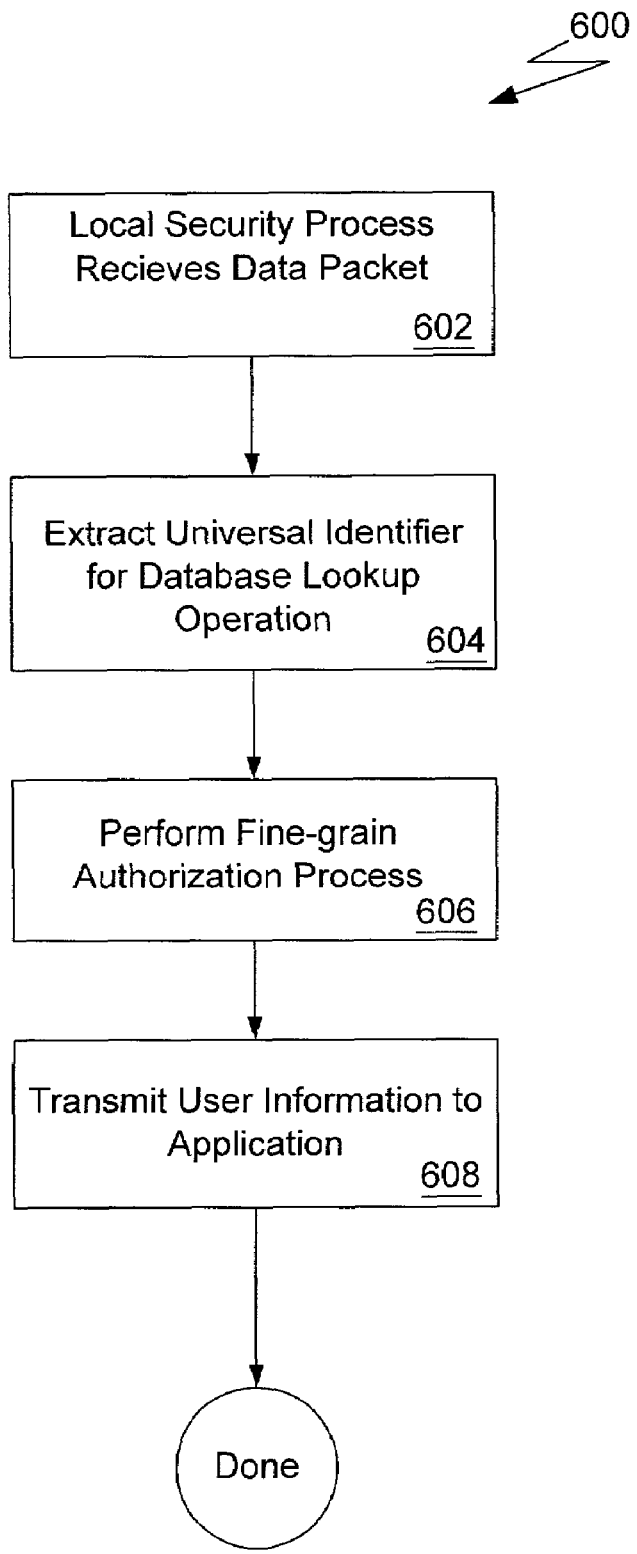
FIG. 6 is a flow chart of a fine-grain authorization process according to one aspect of the present invention.

FIG. 6 depicts a flow chart of a procedure for a fine-grain authorization process 600. A local security process running on a back-end server receives the data packet from the central security process (step 602). The local security process then extracts the universal identifier from the data packet for use in a lookup operation (step 604). In the next step, a fine-grain authorization process is performed using the universal identifier to retrieve user entitlement data from the local security process's local database (step 606). The local security process then transmits the user entitlement data to the web-based application (step 608). When the web-based application receives the user data, the identified user is deemed to be authenticated and authorized to access the application due to the way in which the user data arrived, that is, by way of the central security process and local security process.

The universal identifier can also be used by an enterprise's business partners when a user is sent to an affiliate's web site from an application running on the enterprise network. A software system running on the affiliate's web site extracts the universal identifier from the cookie that was stored in the user's browser and uses the universal identifier to locate the user's entitlements on a resource within the affiliate's network in the same way as that described on a back-end server in the enterprise network.

The present invention is scalable. The local security processes require only the universal identifier to locate a user record. Thus, when a new user is provisioned, the system administrators simply include the universal identifier in the user's records stored on the appropriate systems. If the user changes his or her login name, password, or credentials, the universal identifier remains unchanged. Therefore, the security processes, authorization databases, and applications are unaffected and no update is necessary.

As will be appreciated by those skilled in the art, modifications may be made to the disclosed embodiments without violating the spirit of the invention disclosed herein. For example, the present invention may use communication protocols other than HTTP (e.g., the secure HTTP protocol). In addition to LDAP and ODBC directories, other directories may be used (e.g., the Active Directory available from Microsoft Corporation of Redmond, Wash. and the SecureWay Directory available from IBM Corporation of Armonk, N.Y.). Furthermore, the central security process may be executed when the user first attempts to enter a web site or when the user first attempts to access a protected application.

The present invention was described using cookies as the vehicle in which the universal identifier is transmitted to the resources in an enterprise network. However, the universal identifier can be stored in other vehicles. Additionally, if a browser does not permit cookies to be stored, the enterprise network can store the universal identifier and other data in a centrally accessible storage resource in the enterprise network. For example, in a cookieless environment the universal identifier can be stored in a session server and the back-end servers may obtain the universal identifier from the session server using a unique key such as a Secure Sockets Layer (SSL) identifier or an Internet protocol (IP) address.

Implementations can change the order in which steps are performed, combine various steps, or add steps in one or more procedures discussed herein. For example, the universal identifier may be packaged and transmitted to the user's browser after the authentication process completes or after the course-grain authorization process completes. Furthermore, an implementation can combine the authentication and coarse-grain authorization databases as a single database. Additionally, rather than having one local security process per back-end server, each application on a back-end server can have a separate local security process directly programmed into the application.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method for authenticating and authorizing a user of an electronic device in communication with a network, comprising:

registering said user with a network;

generating a unique universal user identifier representing said user at the time said user registers with said network, said unique universal user identifier being at least partially based on information supplied by said user during registration with said network;

receiving a user request from said user, said user using said electronic device in communication with the network;

searching for information relating to said user in a repository of user information, said searching based at least partially on said user request and a login identity supplied by said user;

retrieving, from the repository of user information, said unique universal user identifier representing said user upon locating said information of said user;

storing at least said unique universal user identifier in a data packet;

sending said data packet to a storage device such that said data packet is transmittable to electronic devices in communication with said network when said user attempts to access a resource within said network;

retrieving an authorization datum associated with said user, based at least partially on said unique universal user identifier, from said resource; and wherein said user attempts to access said resources within said network is permitted without authentication time-out interval using said data packet.

2. The method of claim 1, wherein receiving the user request comprises receiving a login name from said user.

3. The method of claim 1, further comprising:
inserting said unique universal user identifier in said repository of user information; and
populating a plurality of repositories containing authorization data with said user identifier.

4. The method of claim 1, further comprising receiving a security identity from said user.

5. The method of claim 1, further comprising receiving a digital certificate from said user.

6. The method of claim 1, further comprising indicating a result to said user regarding permitted access to said network.

7. The method of claim 1, further comprising requesting a user credential of said user.

8. The method of claim 1, wherein sending said data packet to a storage device comprises sending said data packet to a user electronic device supporting said storage device.

9. The method of claim 1, further comprising storing information in addition to said unique universal user identifier in said data packet.

10. The method of claim 1, wherein sending said data packet to a storage device comprises transmitting a cookie to said user electronic device enabling an identity of said user to be automatically recognized when said cookie is transmitted to said resource within said network.

11. The method of claim 1, further comprising encrypting said data packet.

12. The method of claim 1, wherein said unique universal user identifier comprises at least part of an account number or a social security number of the user.

13. A method for accessing a plurality of resources having different authorization requirements, comprising:
registering a user with a network;
generating a unique universal user identifier representing said user at the time said user registers with said network, said unique universal user identifier being at least partially based on information supplied by said user during registration with said network;

accessing, via an electronic device, said network work comprising said plurality of resources;

providing identifying data to said network;

retrieving, in response to the identifying data, said unique universal user identifier from a repository of unique universal user identifiers;

storing said unique universal user identifier on a storage device, said unique universal user identifier indicating said user is authenticated; and accessing one of said plurality of resources, wherein said unique universal user identifier is transmitted to said one of said plurality of resources to identify said user such that said user can access authorized resources without providing additional identifying information and without authentication time-out interval using said unique universal identifier and wherein said user is denied access to unauthorized resources.

14. The method of claim 13, further comprising providing a key to retrieve an authorization datum associated with one of said plurality of unique universal user identifiers matching said unique universal user identifier from one of said plurality of resources.

15. The method of claim 13, wherein providing identifying data to said network comprises supplying at least one of a login name, a password, and a digital certificate.

16. The method of claim 13, wherein providing identifying data to said network comprises providing user credentials.

17. The method of claim 13, wherein providing identifying data to said network comprises providing a digital certificate.

18. The method of claim 13, wherein said unique universal user identifier comprises at least part of an account number or a social security number of the user.

19. A method for user authentication and authorization, comprising:
accessing a repository containing a plurality of unique universal user identifiers, each of said unique universal user identifiers being unique to a user;

retrieving one of said unique universal user identifiers from said repository, storing said unique universal user identifier in a data packet readable by an electronic device;

transmitting said data packet to a storage device coupled to said electronic device; making said data packet available to a resource configured within an enterprise network to authorize said user and said user accessing said resources without authentication time-out interval using said data packet.

20. The method of claim 19, wherein storing said unique universal user identifier comprises packaging said unique universal user identifier in a cookie suitable for storage on at least one of a user electronic device and a user proxy electronic device.

21. The method of claim 20, further comprising employing a software program to access a network reading said storage device.

22. The method of claim 20, further comprising employing a web browser to access a network reading said storage device.

23. The method of claim 19, further comprising:
delivering said data packet to said resource configured within said enterprise network;
extracting said unique universal user identifier from said data packet;

accessing a repository containing a plurality of user entitlement data; and retrieving a user-specific entitlement from said repository containing said plurality of user entitlement data using said unique universal user identifier to locate said user-specific entitlement.

24. The method of claim 19, wherein said unique universal user identifier comprises at least part of an account number or a social security number of the user.

25. A system for user authentication and authorization, comprising:

a repository containing a plurality of unique universal user identifiers, each unique universal user identifier being unique to a user;

a first software tool operable to receive user login information, access said repository, retrieve one of said plurality of unique universal user identifier relating to said user from said repository, and transmit said unique universal user identifier to an electronic storage device suitable for storing said unique universal user identifier in a data packet for transmission to resources within a network;

a second software tool suitable for receiving said data packet and locating authorization datum of said user; and said user accessing said resources without authentication timeout interval using said data packet.

26. The system of claim 25, wherein said electronic storage device is readable by a software program suitable for accessing said network.

27. The system of claim 26, wherein said software program is a web browser.

28. The system of claim 25, wherein said electronic storage device is a resource configured within said network.

29. The system of claim 25, further comprising a repository containing authorization data, said repository containing authorization data accessible using said unique universal user identifier as a key to retrieve a user-specific entitlement associated with said user.

30. The method of claim 25, wherein said unique universal user identifier comprises at least part of an account number or a social security number of the user.

31. A computer-readable medium encoded with logic operable, when executed on a computer processor, to perform steps comprising:

receiving a user request from a user of an electronic device;

searching for a user credential corresponding to said user in an authentication database;

locating said user credential in said authentication database;

retrieving from said authentication database a unique universal user identifier representing said user upon locating said user credential;

packaging said unique universal user identifier in a data packet; and transmitting said data packet to said electronic device such that said data packet is transmittable to electronic devices in communication with a network when said user attempts to access a resource within said network such that said user can access authorized resources without providing additional identifying information and without authentication timeout interval using said data packet.

32. The computer-readable medium of claim 31, further operable, when executed on a computer processor, to perform the steps comprising:

transmitting said data packet to said resource within said network;

accessing a repository containing a plurality of unique universal user identifiers using said packaged unique universal user identifier in a search operation; and retrieving a user-specific entitlement from said repository containing a plurality of unique universal user identifiers, said user-specific entitlement associated with said packaged unique universal identifier.

33. The computer-readable medium of claim 31, further operable, when executed on a computer processor, to perform the step of requesting a user credential.

34. The method of claim 31, wherein said unique universal user identifier comprises at least part of an account number or a social security number of the user.

* * * * *